United States Patent

[11] 3,633,563

| [72] | Inventors | George E. Osborn<br>239 Wylie Street, Saginaw, Mich. 48602;<br>Bernard W. Tunney, Sr., 3217 Roberts<br>Street, Saginaw, Mich. 48601 |
|---|---|---|
| [21] | Appl. No. | 886,457 |
| [22] | Filed | Dec. 19, 1969 |
| [45] | Patented | Jan. 11, 1972 |

[54] MATERIAL HEATER
9 Claims, 8 Drawing Figs.

| [52] | U.S. Cl. | 126/343.5 A |
|---|---|---|
| [51] | Int. Cl. | E01c 19/45 |
| [50] | Field of Search | 126/343.5, 343.5 A; 94/42 |

[56] References Cited
UNITED STATES PATENTS

| 1,376,852 | 5/1921 | Andresen | 94/42 |
|---|---|---|---|
| 1,613,736 | 1/1927 | Andresen | 94/42 |
| 2,041,359 | 5/1936 | Littleford, Jr. | 126/343.5 A |
| 2,728,336 | 12/1955 | Elgeti | 126/343.5 A |
| 2,833,187 | 5/1958 | Wells et al. | 126/343.5 A X |
| 3,386,435 | 6/1968 | Heller | 126/343.5 A |

Primary Examiner—Charles J. Myhre
Attorneys—Clarence A. O'Brien and Harvey B. Jacobson

ABSTRACT: A self-feeding hopper for containing heated or heating mixed bituminous or other materials for patching, repairing or resurfacing street pavements, parking lots and other uses where heated materials are required. The hopper is constructed as a part of a mobile chassis and includes spaced inner and outer bottom and sidewalls with the spacing between the inner and outer walls defining heat chamber portions into which heated gases are delivered for heating the inner walls of the hopper. One sidewall of the hopper includes an outlet opening adjacent the inner bottom wall of the hopper and a generally horizontal heated work platform is supported outwardly of the outlet opening for receiving semifluent heated materials thereon flowing outwardly through the outlet opening. The platform is disposed at an elevation within 2 feet of the ground enabling workmen to readily shovel material therefrom to the ground.

George E. Osborn
Bernard W. Tunney, Sr.
INVENTORS

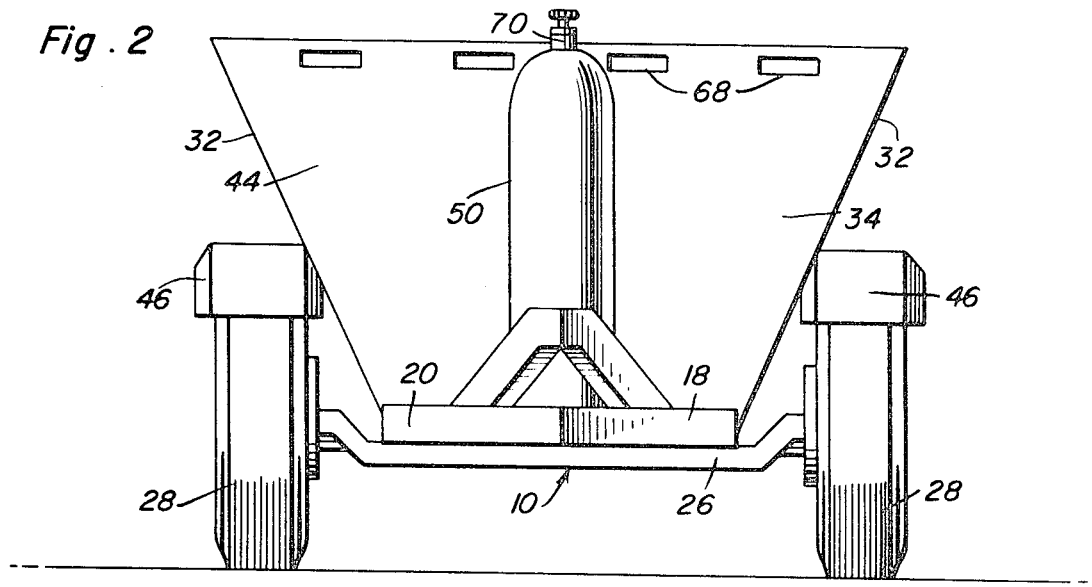
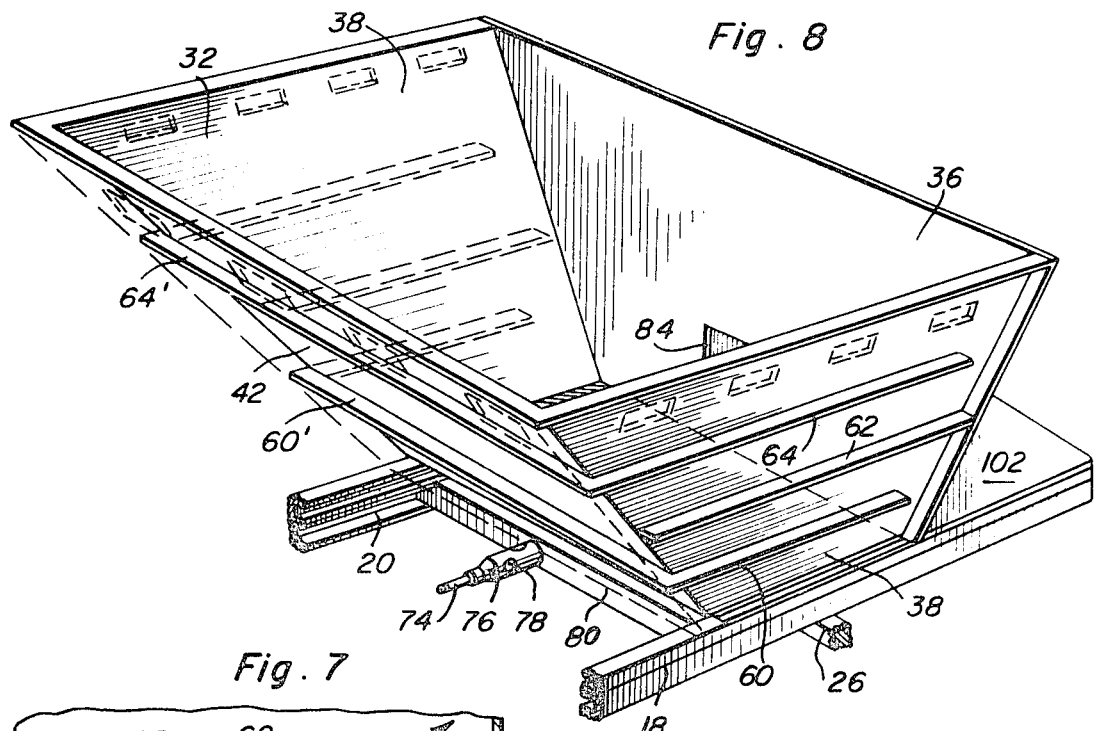
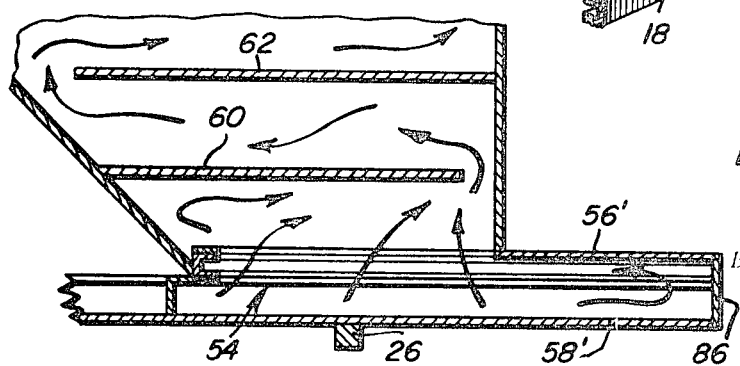

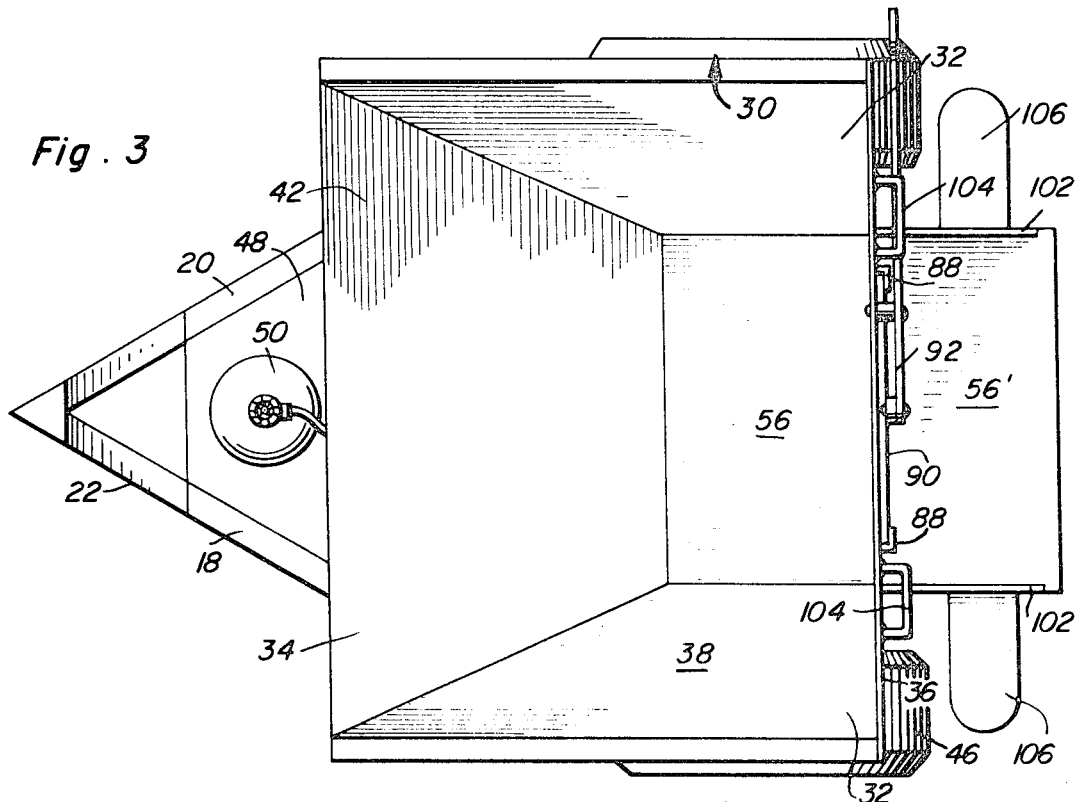
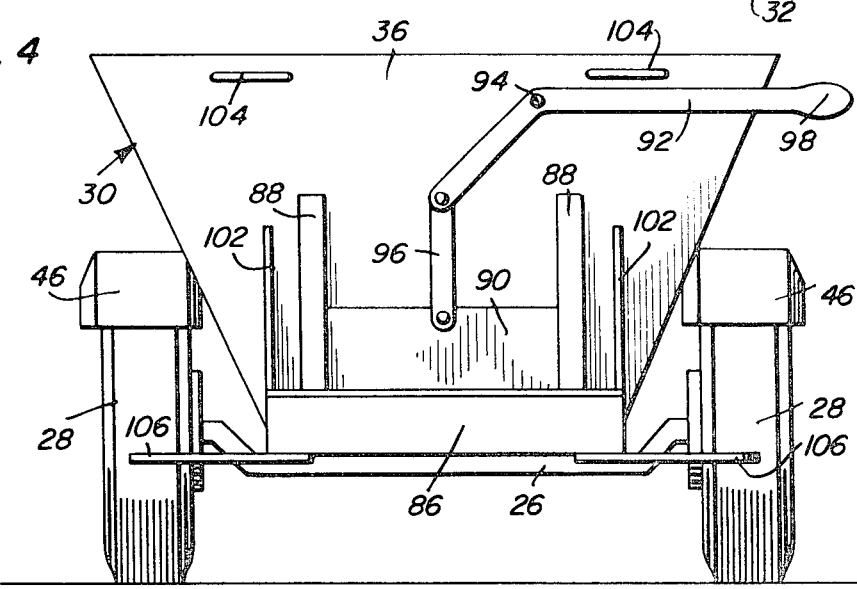

MATERIAL HEATER

The material heater of the instant invention has been specifically designed to provide a completely self-contained mobile container in which mixed bituminous materials may be heated or maintained heated and in a semifluent state.

The present practice of patching chuckholes or other pavement maintenance work is haphazard at best. The mixed bituminous material to be utilized in patching chuckholes and the like is dumped into a dump truck body or pickup truck at the location in which the material is mixed and heated. Then, the dump truck or pickup truck must travel to the location in which the required pavement repairs are being made and stand until the pavement or job has been properly conditioned for receiving the bituminous material to be used in the patching operation. During this period between loading the heated mixed bituminous material onto the truck and shoveling the bituminous material from the truck into a chuckhole to be patched, the temperature of the heated bituminous mix is reduced appreciably even though a cover may be used on the truck over the bituminous material during transit.

The amount of reduction in temperature of the bituminous material is of course somewhat determined by the temperature of the ambient atmosphere although it is to be understood that the temperature loss is sufficient even on hot days for the bituminous material to lose a good deal of its adhesive properties.

In addition, the present method of utilizing dump trucks and pickup trucks for transporting the bituminous material to the location in which pavement patching is to be accomplished requires additional men to shovel the mixture or material from the truck to the ground, the lowest point of the load bed of such trucks being 4 feet or more from the ground.

During cold weather so much heat of the bituminous material is lost during transit and while standing during unloading that it is common practice to use a heating torch on the material at the side in which the pavement patching is to be accomplished. However, direct flame applied to any bituminous product burns off the asphaltum and light volatile liquids which are necessary to maintain the adhesive properties of the material and the latter becomes dry and charred before being used with the result that it is quickly pounded out of filled potholes by traffic. The material heater of the instant invention completely eliminates the above undesirable methods of handling mixed bituminous materials and excessive cooling of such materials before they are utilized in pavement patching. The material heater includes a wide self-feeding hopper which is suitable for loading with a bucket loader and which includes heating means by which the bottom, sidewalls and working platform of the hopper are heated from the exteriors thereof. Although it is not necessary, the hopper may be provided with a lid or cover thus reducing the amount of heat energy required to maintain the bituminous mixture within the hopper at the proper temperature.

The main object of this invention is to provide a self-contained portable or mobile transport for heating and maintaining the temperature of mixed heated bituminous or other materials and which will be capable of heating or maintaining such materials at the desired temperature even during extended periods of transit or delays during preparatory work before or during application and which will be operative to provide ample heat to thaw out cold or frozen materials and maintain them in a workable condition without burning off the volatile liquids thereof.

Another object of this invention is to provide a mobile transport in accordance with the immediately preceding object constructed in a manner whereby the heated bituminous materials disposed therein may be readily discharged therefrom to a low level heated work platform from which the bituminous material may be readily shoveled to the ground by a single workman with a minimum of effort.

A still further object of this invention is to provide a portable or mobile transport in accordance with the preceding objects and which may be readily constructed in various sizes.

Another object of this invention is to provide a hopper for containing mixed bituminous materials and maintaining such materials at the desired temperature with the hopper constructed in a manner whereby it either may be supported from or constructed as a part of any suitable wheeled chassis or carried in a truck or placed in any stationary position, if desired.

A final object of this invention to be specifically enumerated herein is to provide a mobile transport for mixed bituminous materials which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 2 is a front elevational view of the material transport;

FIG. 3 is a top plan view of the material transport;

FIG. 4 is a rear elevational view of the material transport;

FIG. 7 is a fragmentary longitudinal vertical sectional view taken substantially upon the plane indicated by the section line 7—7 of FIG. 5; and FIG. 8 is a perspective view of the hopper portion of the transport shown with the outer rear and opposite sidewalls removed.

Figure 1:
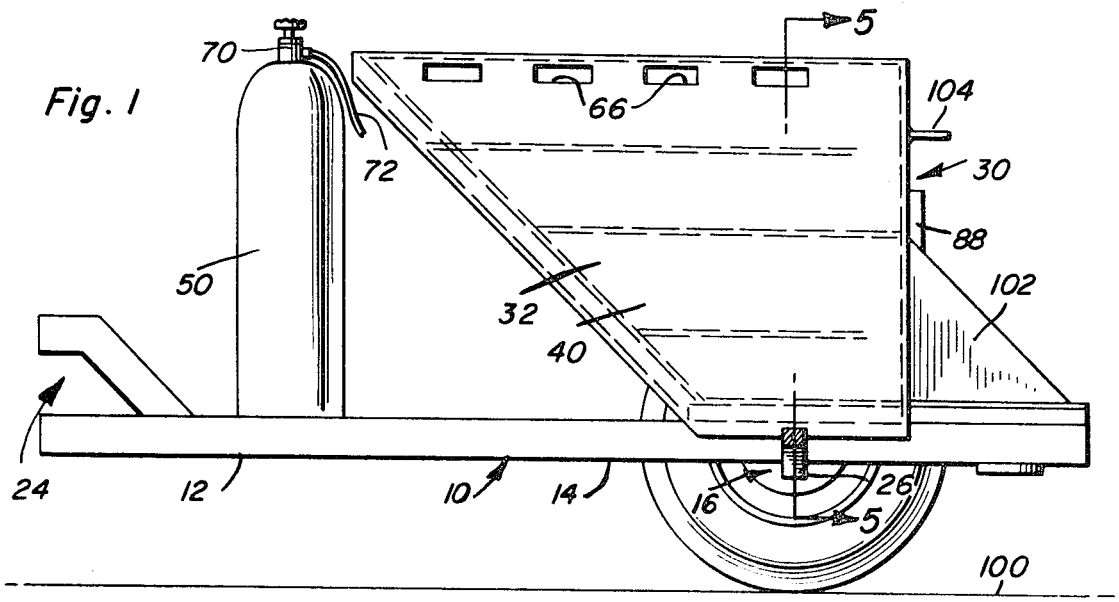
FIG. 1 is a left side elevational view of the mobile transport of the instant invention with the near left side axle end and associated ground wheel being broken away and the axle illustrated in vertical section.
Figure 5:
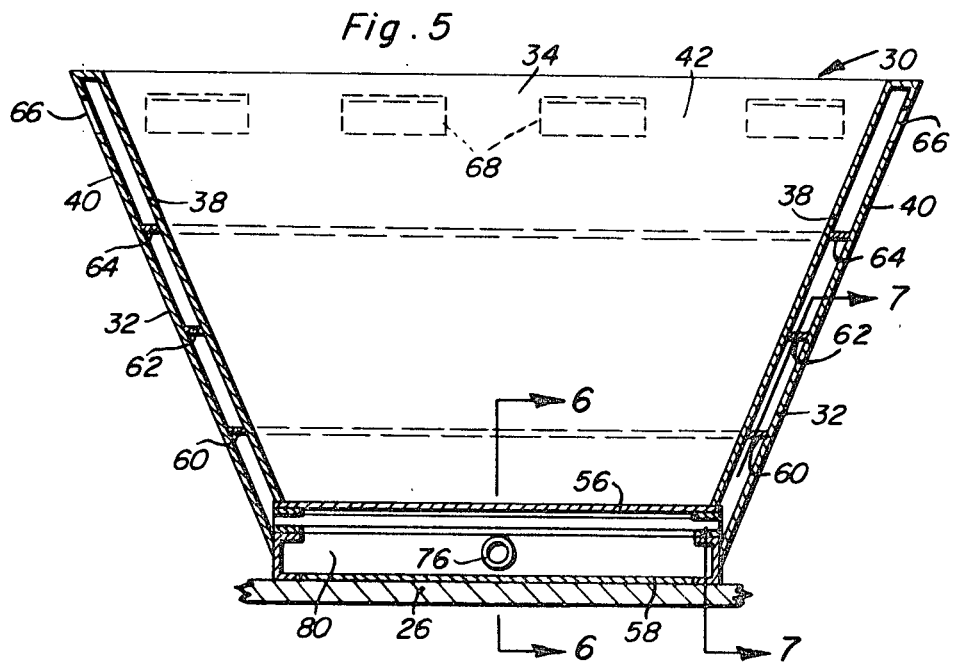
FIG. 5 is a fragmentary enlarged transverse vertical sectional view taken substantially upon the plane indicated by the section line 5—5 of FIG. 1.
Figure 6:
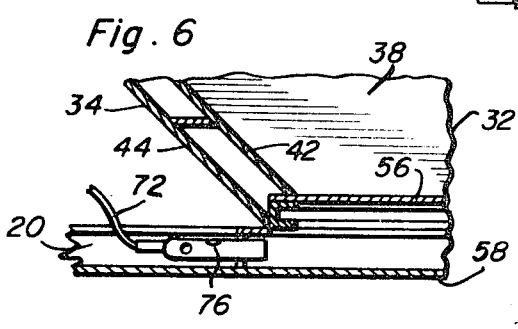
FIG. 6 is a fragmentary longitudinal vertical sectional view taken substantially upon the plane indicated by the section line 6—6 of FIG. 5.

Referring now more specifically to the drawings, the numeral 10 generally designates the material transport which includes a chassis 12 provided with a main frame 14 and an axle assembly referred to in general by the reference numeral 16. The main frame 14 includes a pair of opposite side longitudinal frame members 18 and 20 whose forward ends converge toward each other to form a towing tongue 22. The forward end of the towing tongue 22 includes a hitch assembly referred to in general by the reference numeral 24 whereby the forward end of the chassis 12 may be connected to a towing vehicle.

The axle assembly 16 includes a transverse axle member 26 whose opposite ends pass beneath and are secured to the longitudinal members 18 and 20 and have ground-engaging wheels 28 rotatably journaled thereon.

The material transport 10 includes a hopper assembly referred to in general by the reference numeral 30 consisting of opposite sidewall assemblies 32, a front wall assembly 34 and a rear wall 36. The sidewall assemblies 32 each includes inner and outer walls 38 and 40 and the front wall assembly 34 also includes inner and outer walls 42 and 44. The outer sidewalls 40 include fenders 46 which overlie the upper peripheral portions of the wheels 28 and the forward end portions of the longitudinal frame members 18 and 20 have a support plate 48 secured therebetween from which a bottle 50 of liquefied petroleum gas may be supported.

The hopper or hopper assembly 30 further includes a bottom wall assembly referred to in general by the reference numeral 54 and consisting of inner and outer bottom walls 56 and 58.

A closed combustion chamber is defined between the inner and outer or upper and lower bottom walls 56 and 58 and the opposite side marginal portions of the upper bottom wall 56 between the lower marginal edge portions of the inner front wall 42 and the rear wall 36 is cut away to provide communication with the lower ends of the hollow spaces defined between the inner and outer sidewalls 38 and 40 of the sidewall assemblies 32. In addition, from FIG. 8 of the drawings, it may be seen that the sidewall assemblies 32 include vertically spaced heat baffles 60, 62 and 64 and also that the baffles 60 and 64 include portions 60' and 64' disposed between the inner and outer walls 42 and 44 of the front wall assembly 34.

The upper marginal edge portions of the outer sidewalls 40 include vent outlet openings 66 while a plurality of vent outlet openings 68 are formed in the upper marginal edge portion of the outer front wall 44.

The tank or bottle 50 has an outlet valve 70 operatively associated with its upper end and the valve 70 discharges into a gas line 72 whose outlet end 74 opens into a burner nozzle 76 having air inlet openings 78 formed therein. The end of the nozzle 76 remote from the line 72 opens through a partial front wall 80 closing the rear end of the combustion chamber defined between the inner and outer bottom walls 56 and 58 and accordingly, the burner nozzle 76 may be actuated to discharge a combustible mixture of fuel and air into the combustion chamber for ignition. Of course, the heat of combustion is trapped in the combustion chamber and passes upwardly between the inner and outer wall portions of the opposite sidewall assemblies 32 and the front wall assembly 34. Thus, the inner walls 38 and 42 are heated from their exteriors. Further, the inner bottom wall 56 is heated from below and it will be noted that the rear wall 36 has an outlet opening 84 formed therein and that the rear edge portions of the upper and lower bottom walls 56 and 58 include rearward extensions 56' and 58' which project rearwardly of the lower marginal edge portion of the rear wall 36. The rear ends of the extensions 56' and 58' are interconnected by means of a combustion chamber rear wall 86. Of course, the longitudinal members 18 and 20 also project rearwardly of the lower marginal edge portion of the rear wall 36 whereby the rear portions of the combustion chamber are closed at their sides also.

The lower marginal edge portion of the outlet opening 84 is defined by the upper surface of the extension 56' which of course is coplanar with the inner bottom wall 56 and accordingly, heated mixed bituminous material disposed within the hopper assembly 30 may readily flow in its semifluent state through the outlet opening 84 and onto the platform defined by the extension 56'. However, a pair of angle irons 88 are secured to the outer surface of the rear wall 36 on opposite sides of the outlet opening 84 and define channels in which the opposite side marginal edge portions of a vertically shiftable door 90 for the opening 84 are slidably received. An actuating lever 92 is pivotally supported from the rear wall 36 as at 94 and operatively connected to the door 90 by means of a connecting link 96. Therefore, downward movement of the free handle end 98 of the lever 92 will cause the door 90 to be elevated so as to uncover the outlet opening 84 and allow semifluent heated and mixed bituminous material to flow from within the hopper assembly 30 outwardly through the opening 84 and onto the platform defined by the extension 56'.

The platform 56' is disposed at an elevation less than 2 feet above the ground 100 upon which the wheels 28 rest and therefore bituminous material disposed on the platform 56' may be readily shoveled therefrom into a pothole to be filled.

The opposite side marginal edge portions of the platform 56' are braced relative to the rear wall 36 by means of triangular gusset plates 102 which define opposite sidewall portions for the platform 56' and a pair of opposite side handles 104 are mounted on upper opposite side portions of the rear wall 36 to be grasped by workmen standing on abbreviated footrests 106 carried by and projecting outwardly from opposite side portions of the rear end of the main frame 14.

If desired, the various vent openings 66 and 68 may be provided with manually shiftable shutters (not shown) for varying the flow of heated gases through the combustion chamber and the hollow sidewall assemblies 32 and the hollow front wall assembly 34. In operation, the material transport 10 may be transported to the point of supply of heated and mixed bituminous material and the desired quantity of such material may be readily dumped into the hopper assembly 30. The burner nozzle 76 is then actuated so that the bituminous material within the hopper assembly 30 will be maintained at the desired temperature during its transit to its point of use. The open top of the hopper assembly 30 may be closed by a suitable top wall (not shown) if desired although such a top wall is not necessary but merely provides a means whereby heat within the hopper assembly 30 may be trapped against ready escape thus requiring less heat input from the burner assembly 76 to maintain the bituminous material within the hopper assembly 30 at the desired temperature.

After the material transport 10 has been transported to the point of pavement repair, a single workman may actuate the lever 92 so as to discharge approximately the desired amount of bituminous material from within the hopper assembly 30 to the upper surface of the platform 56' through the outlet opening 84. Then, the workman may readily shovel the heated bituminous material into the pothole which is to be filled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hopper for containing mixed bituminous or other materials for patching pavements, said hopper including a bottom wall and upstanding sidewalls, one of said sidewalls having a lower outlet opening formed therein, means operative to close and open said outlet opening to the outward flow of semifluent material therethrough, and means operative to heat said bottom and sidewalls, said hopper including a generally horizontally disposed work platform outwardly of said one sidewall onto which heated semifluent material discharged through said outlet opening may flow, a wheeled chassis from which said hopper is supported, said platform being disposed at an elevation less than 2 feet above a surface upon which said chassis rests, said platform comprising an outward extension of said bottom wall, said heating means also including means for heating said platform from beneath, a plurality of upstanding and outstanding gusset plates spaced along said one sidewall on opposite sides of said opening and secured to opposite marginal edge portions of said platform at their lower marginal portions and to the adjacent external surfaces of said hopper disposed alongside said opening, said gusset plates functioning as opposite sidewalls of said platform.

2. The combination of claim 1 wherein said means operative to heat said bottom and sidewalls includes means for heating said walls from the exterior thereof.

3. The combination of claim 1 wherein said bottom and sidewalls include inner and outer wall panels between which heat chambers are defined, said heat chambers being communicated therewith, said means operative to heat said bottom and sidewalls including means operative to deliver heated gases into one of said chambers.

4. The combination of claim 7 wherein said bottom and sidewalls include inner and outer wall panels between which heat chambers are defined, said heat chambers being communicated therewith, said means operative to heat said bottom and sidewalls including means operative to deliver heated gases into one of said chambers, said hopper including a generally horizontally disposed work platform outwardly of said one sidewall onto which heated semifluent material discharged through said outlet opening may flow.

5. The combination of claim 4 wherein said sidewalls include outwardly opening vent openings opening outwardly through the upper marginal portions of the outer wall panels thereof, said one of said heat chambers comprising the bottom wall heat chamber.

6. The combination of claim 1 wherein said bottom and sidewalls include inner and outer wall panels between which heat chambers are defined, said heat chambers being communicated therewith, said means operative to heat said bottom and sidewalls including means operative to deliver heated gases into one of said chambers, said sidewalls including baffles in said sidewall heat chamber defining tortuous passages extending therethrough through which said heated gases may pass.

7. A hopper for containing mixed bituminous or other materials for patching pavements, said hopper including a bottom wall and upstanding sidewalls, one of said sidewalls having a lower outlet opening formed therein, means operative to close and open said outlet opening to the outward flow of semifluent material therethrough, means operative to heat at least some of said walls, said hopper including a generally horizontally disposed work platform projecting outwardly of said one sidewall to which heated semifluent material discharged through said outlet opening may flow, said heating means also including means for heating said platform, a plurality of upstanding and outstanding gusset plates spaced along said one sidewall on opposite sides of said opening and secured to opposite marginal edge portions of said platform at their lower marginal portions and to the adjacent external surfaces of said hopper disposed alongside of said opening, said gusset plates functioning as opposite sidewalls of said platform.

8. The combination of claim 7, including a wheeled chassis from which said hopper is supported, said platform being disposed at an elevation less than 2 feet above a surface upon which said chassis rests.

9. The combination of claim 7 wherein said heating means also includes means for heating said platform from beneath.

* * * * *